June 13, 1944.   P. F. K. ERBGUTH   2,351,326
PREDETERMINING SYSTEM
Filed Aug. 2, 1940
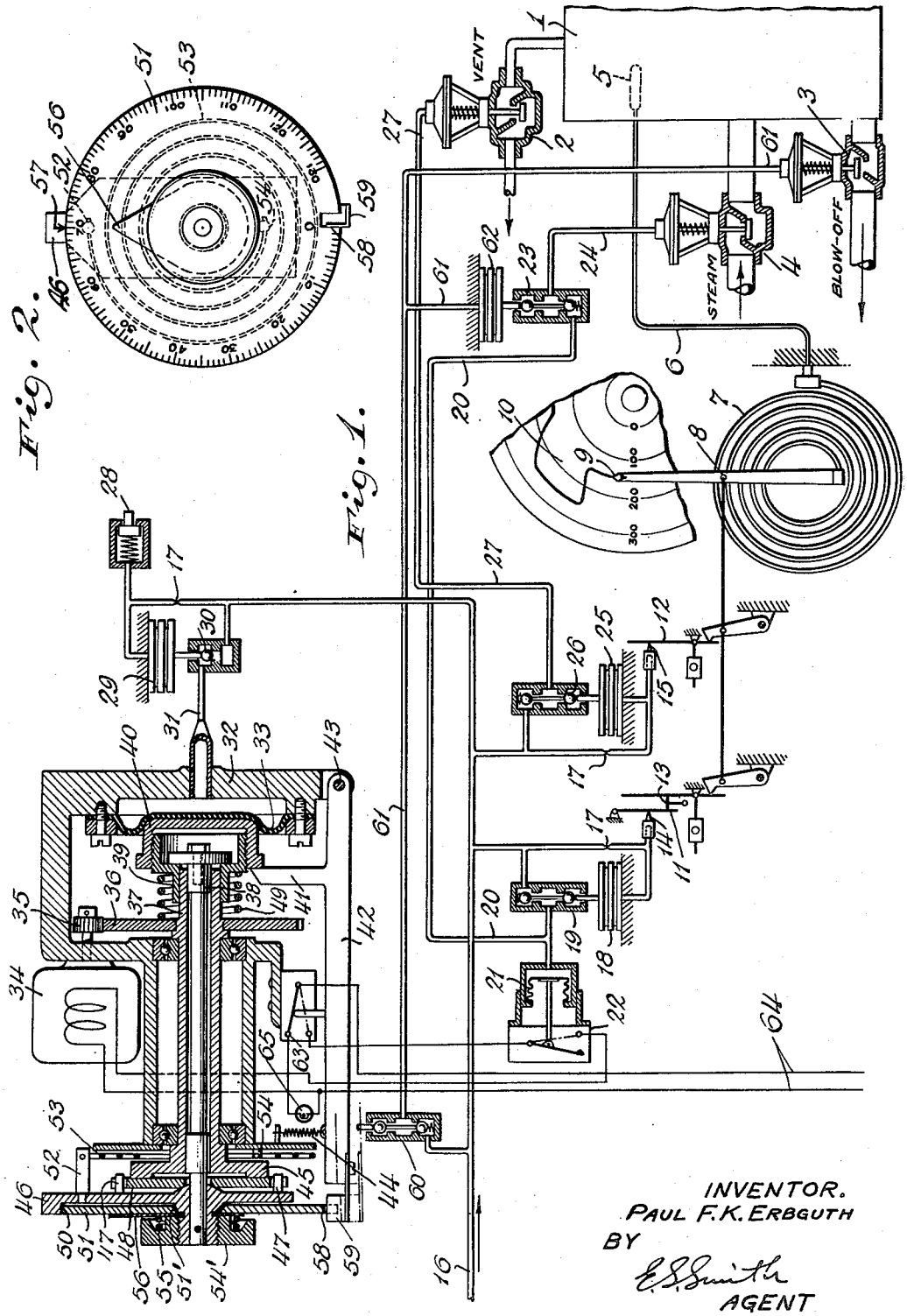
INVENTOR.
PAUL F. K. ERBGUTH
BY
AGENT Patented June 13, 1944

2,351,326

UNITED STATES PATENT OFFICE 2,351,326

PREDETERMINING SYSTEM

Paul F. K. Erbguth, Brooklyn, N. Y., assignor to Charles J. Tagliabue Mfg. Co., Brooklyn, N. Y., a corporation of New York Application August 2, 1940, Serial No. 349,991

13 Claims. (Cl. 236—46)

The invention relates broadly to methods of and means for automatically predetermining repeated identical quantities, whether of time or of a material substance, and in which a physical condition of a process determines the instant of starting the running of the quantity as in the Bast et al. Patent 1,959,336.

The invention relates particularly to timers for automatically controlling process systems through a normally repetitive cycle in which a predetermined processing condition is to be maintained for a predetermined time. While not limited to time-temperature control, it is particularly suited for use in timing systems for cooking, vulcanizing or the like.

It is the principal object of the invention to provide an improved process predetermining device in which a cycle of operations is manually initiated by an operator and automatically terminated when the process is complete as determined by the interaction of the device with the process.

It is an object of the invention to provide a novel predetermining unit which is inexpensive, compact, simple, and particularly adapted to govern the operation of such system.

Another object of the invention is to provide such a device with a quantity or duration setting means which may be readily adjusted to conveniently alter the duration from one value to another. A related object is to provide such a device with a simple and readily manipulatable means by which a cycle of operations may be initiated with only a momentary action upon the part of the operator.

Still another object of the invention resides in the provision of such a device or timer with a separately adjustable means by which a physical condition of the processing system which is related with the processing condition may have its value altered so that it will occur in a desired time position as related to the time during which the processing condition is effective. A generally similar object is to provide such a timer with means for governing with an adjustable sensitivity of control the processing condition. A further related object is the provision of such a timer system with a means for altering still another physical condition of the system which is related to the processing condition and the initiation of the processing duration in accordance with such governing.

These and other objects of the invention will appear to those skilled in the art from the specification and the accompanying drawing in which is described and illustrated a timer by way of example as a specific embodiment of my invention. It is my intention to claim all that I have disclosed which is inventive, new and useful.

In the accompanying drawing, Fig. 1 is a front elevation, partially in section, of the system in which the timer unit itself is shown in considerable detail and the remainder of the system appears more diagrammatically; and Fig. 2 is an end elevation of a detail, the duration-setting dial of the timer as viewed from the left in Fig. 1.

The drawing shows the invention applied to the control of, e. g., a cooking process in which the temperature of food is to be maintained at a predetermined value over a predetermined time following the attainment of such temperature. The cooking chamber 1 is provided with an air vent valve 2, a blow-off valve 3 and a steam supply valve 4. Bulb 5 is sensitive to the temperature in the chamber and contains a fluid which expands upon an increase of temperature to move, through capillary tube 6 and spiral bourdon 7, a meter member 8 which is shown provided with recording pen 9 for chart 10 upon which appears a record of the temperature.

Also connected operatively with member 8 are flappers 11 and 12, flapper 11 having its sensitivity adjustable by means of variable radius link 13 for altering the sensitivity. These flappers operate relative to their respective nozzles 14 and 15 both of which nozzles include sleeves which are adjustable with respect to the flappers to predetermine the effective range of operating temperature. It will be noted that the flappers are effectively counter-weighted toward their nozzles so that there is no damage upon a decrease of temperature and upon an increase of temperature they are moved away from the nozzles by the action of the bourdon 7.

Air supply line 16 carries air under, e. g., 18 lbs. per sq. in. gauge pressure and is connected with nozzles 14 and 15 through feed restrictions 17 so that the pressure within nozzles 14 and 15 is dependent upon the opening of their respective flappers. Connected with nozzle 14 is bellows 18 which operates a supply-and-escape pilot 19 which is connected by line 20 with the outside of bellows 21 which operates switch 22, and with the block-and-escape pilot 23 which is connected by line 24 with the diaphragm top of steam valve 4 which is shown as reverse acting. Air supply 16 is also connected with pilot 19 to supply air thereto. Nozzle 15 is similarly connected to bellows 25 which positions pilot 26 which is also supplied with air by supply line 16 and the throttling pressure of which is connected by line 27 with the diaphragm top of vent valve 2 which is shown as reverse acting.

The starting arrangement includes a push button operated air leak valve 28 which is connected with a similar bellows 29 and with an air valve 30 also of the supply-and-escape type but direct acting instead of reverse acting as are air pilots 19, 23 and 26. Air pilot 30 is connected by pipe 31 with a pressure chamber which is walled in by casing 32 and flexible diaphragm 33 which is in generally flat, a timer which will be described later herein being arranged to be started subsequent to the pressing of the starting button 28.

In a timer, an essential quantity is time. Consequently the quantity responsive means in a timer is a timing motor 34 which is connected by gears 35 and 36 with the timing means which includes the timing sleeve 37 for shaft 38. Mounted upon said timing sleeve 37 so that it can move axially is larger but short sleeve 39 which carries cap 40 against which the diaphragm 33 presses when air pressure is upon it. The left hand end (Fig. 1) of cap 40 presses against bell-lever portion 41 of lever 42 which is pivotally mounted upon pin 43 to be angularly moved upwards in a vertical plane, tension spring 44 urging lever 42 upwardly.

Sleeve 37 is provided, at its left hand end, with clutch element 45 which is turned whenever gear 36 is turned by gear 35 and motor 34. Shaft 38 is freely rotatable and also axially movable relative to sleeve 37 and has affixed to its left hand end the timing arm 46 which is connected by two pins 47 with slots in clutch disk 48, the arrangement being such that when shaft 38 is pulled toward the right the clutch disk 48 is pressed against clutch 45 so that arm 46 also turns with the sleeve 37 and with the timing motor 34. Spring 49 is provided to press shaft 38 continuously to the right (in Fig. 1) but is of such a strength that the 18 lbs. per sq. in. air pressure acting upon diaphragm 38 will force cap 40 and sleeve 39 to the left against spring 49 to release the axial force in shaft 38 so that clutch disk 48 is free from clutch 45 so that arm 46 is then free to turn.

Arm 46 is provided with a locking portion or surface 50 for locking disk cam 51 which has time graduations on its face near its periphery and is loosely mounted on the conical hub 51' of arm 46. Arm 46 is also provided with stud 52 which is connected with one end of spring 53 whose other end is affixed to the mounting base 54 to which spring 44 is also attached. Spring 53 is a flat spiral spring which is strong enough to angularly move arm 46 rapidly in a counter-clockwise direction (see Fig. 2) when clutch elements 45, 48 are free and which spring is, however, weak enough to be wound in a clockwise direction (see Fig. 2) by timer motor 34 when clutch elements 45, 48 are engaged. A hole in disk 51 is of slightly larger diameter than that of the coacting portion of hub 51'. The left hand (Fig. 1) or outer end of the hub of arm 46 is threaded and provided with a clamping nut 54' which has a compression spring 55 forcing against index plate 56, the arrangement being such that screwing nut 54' tightly up against index plate 56 forces the hole in the cam to ride along the upper surface of conical hub 51' so that the periphery of cam 51 is forced into contact with locking surface 50 of timing arm 46. The outer end of arm 46 is provided with index 57 which is shown (in Fig. 2) lined up with index plate 56, index plate 56 resting in two parallel bottom grooves in the hub of arm 46 so as to set in such relation, the width of such grooves having sufficient clearance so that index plate 56 is movable axially of the hub of arm 46. The periphery of disk 51 is provided with a notched portion 58 into which a resilient extension 59 of detent lever 42 may rise when the pressure is off of diaphragm 33, this extension being shown to be L-shaped in Fig. 2.

Air valve 60 of the supply-and-escape type is arranged to be abutted by lever 42 when such lever is in a sufficiently depressed position to have extension 59 below or on the periphery of cam 51. Air valve 60 then admits pressure to line 61 which is connected with the diaphragm top of direct acting blow-off valve 3 and with the bellows 62 which actuates block-and-escape pilot 23, the arrangement being such that this depressed position of lever 42 causes an increase in the pressure within bellows 62 and a lowering of the valve of pilot 23 so that pilot 23 connects lines 20 and 24 so that steam valve 4 is then governed by the throttled pressure of air valve 19. In such lowered position of lever 42, running switch 63 for the motor is in its lowest position (shown dotted in Fig. 1), so that the current from supply lines 64 is connected with motor 34 through switch 63 and switch 22 which is in series with switch 63, when both switches are closed.

With the lever 42 in its upper position in which spring 44 pulls detent 59 up against the bottom of notch 58 (the position shown in Fig. 1), the current flows from line 64 through signal lamp 65 and the upper contact of switch 63.

The operation of the system is as follows for the stated cooking process: The operator sets the desired quantity, cooking temperature in this case, by horizontally adjusting the position of the sleeve of nozzle 14 relative to flapper 11 and selects a suitable sensitivity by the vertical position of the idler lever 13. He then adjusts the horizontal position of the sleeve of nozzle 15 relative to its flapper 12 so that the vent will be closed only after the steam has been put on and at a time when the temperature of chamber 1 is nearly up to its processing value. If detent 59 is not already in notch 58, he turns disk 51 clockwise so that detent 59 snaps into the notch. He then loosens nut 54' and manually turns arm 46 to a position which, as indicated by the graduations on the periphery of cam 51, predetermines the desired time of maintaining the cooking temperature, after which he turns nut 54' to secure the cam 51 and its arm 46 in their set position. The controller is now ready for operation.

The operator then sees that the chamber is loaded with food, e. g. in cans, and that its door (not shown) is clamped shut so that steam under pressure may be safely supplied to the chamber. To start the cycle, he then presses button 28 which releases air pressure from bellows 29 and pilot 30 rises to admit pressure to diaphragm 33 which forces sleeve 39 and cap 40 (to the left in Fig. 1) to force bell-lever 41 to the left and detent 59 downwardly out of notch 58 of cam 51 so that cam 51 is free to turn and which also releases the axial tension in shaft 38 so that clutch elements 45, 48 are disengaged and spring 53 quickly turns arm 46 in a counter-clockwise direction (in Fig. 2) until the outer end of arm 46 fetches up against resilient detent 59 without jarring.

A momentary manual pressing of leak valve 28 lowers the pressure in bellows 29 for a long enough time to enable arm 46 to come to rest against detent 59. This duration exists, even though after valve 28 is released it automatically closes quickly, since the pressure in bellows 29 builds up only slowly due to the restricted flow through throttling restriction 17. During this time of low pressure in bellows 29, pilot 30 admits a high pressure impulse to act on diaphragm 33 with the result that the cap 40 is pushed quickly to the left to disengage clutch parts 45 and 48, and held there for an appreciable time while this clutch is disengaged, the spiral spring 53 turns the arm assembly until arm 46 rests against the detent 59. When normal pressure is again substantially reached in bellows 29, pilot 30 restores atmospheric pressure to diaphragm 33 and spring 49 pushes cap 40 to the right to cause the re-engagement of clutch parts 45 and 48 so that shaft 38 again turns with sleeve 37. Motor 34 will be able to turn the cam 51 for the set duration as soon as starting switch 22 and running switch 63 are both closed. The downward movement of lever 42 closes switch 63 in the motor circuit; however, starting switch 22 is still open since the temperature of the food within chamber 1 is still below cooking temperature.

This downward movement of lever 42 operates valve 60 to increase the pressure in line 61 and in the diaphragm top of blow-off valve 3 so that such valve closes and the air pressure rises also in bellows 62 which moves pilot 23 to its lower position in which the escape is closed and air line 20 is connected with air line 24 so that the diaphragm top of steam valve 4 is connected with its pilot 19.

Since the temperature of the chamber is low at the start, member 8 will be at the right (Fig. 1) and both flappers 11 and 12 will seal their respective nozzles 14 and 15 so that bellows 18 and 25 are in the upper position as shown and nearly the full air pressure of 18 lbs. is in line 20 so that reverse acting steam valve 4 is wide open and valve 26 is also open thus putting pressure in line 27 and opening vent valve 2. Consequently, the temperature in chamber 1 rises and arm member 8 moves pen 9 to the left and moves flapper 12 to the right so that vent valve 2 is closed as soon as the temperature reaches a value which is sufficient to cause the movement of air valve 26, by bellows 25 downward from the position shown. When the cooking temperature is reached, flapper 11 also moves to the right to drop the pressure in bellows 18, and lowers pilot 19 to drop the pressure in line 20 so that steam valve 4 moves from a wide-open position to a throttling position and switch 22 is closed which immediately starts the timer since switch 63 in the motor circuit was already closed.

Since the spring 49 presses sleeve 39 and hence shaft 38 axially to the right (Fig. 1), it engages clutch members 45, 48 so that the running of motor 34 drives cam 51 through gears 35 and 36, sleeve 37, clutch elements 45 and 48, pins 47, arm 46 and locking portion 50 and conical hub 51' thereof. The motor runs steadily to turn cam 51 in a clockwise direction while the temperature of bulb 5 is being controlled by the throttling of steam valve 4 until the predetermined time has expired.

Then detent 59 rises upwardly into notch 58 thus moving switch 63 upwardly to open the motor circuit and close the circuit for signal lamp 65 which warns the operator that the cooking operation is over. At the same time valve 60 is released from the downward pressure of lever 42 and moves upwardly to shut off the air from line 61 so that the pressure drops in such line and in the diaphragm top of blow-off valve 3 which then opens. The pressure also drops in bellows 62 which then collapses and pilot 23 rises to disconnect line 24 from line 20 and to connect the diaphragm top of the steam valve 4 with the atmosphere so that the steam is promptly shut off.

As the temperature falls, member 8 moves pen 9 to the right (Fig. 1) and moves flappers 11 and 12 to the left to close against their respective nozzles 14 and 15 to build up a pressure in bellows 18 which raises pilot 19 to its upper position as shown in the drawing and the air pressure from line 16 then reaches line 20 and moves bellows 21 to open the starting switch 22. Bellows 25 likewise expands to raise pilot 26 to the position shown so that the air pressure from line 16 reaches line 27 to the diaphragm top of vent valve 2 which opens.

It is apparent that while this method of opening the vent valve is advantageous as being susceptible to a separate adjustment of the temperature at which it is closed and opened, still the invention is not limited to the whole combination but resides also and particularly in special combinations including the improved predetermining unit, herein shown by way of example as a timer. Likewise the time of starting the controlling condition need not be in accordance with the attainment of a constant value of a controlling condition but may be in accordance with the attainment of a predetermined status of such condition as in the case of a timer in which the timing could be initiated with a particular time-temperature relation attained by the system. Further, the invention is not limited to the use of either pneumatic or electric means where these have been used for illustrative purposes since it is common practice to use, e. g., solenoid-operated valves.

The terms and expressions which I have employed are used as terms of description and not of limitation, and I have no intention, in the use of such terms and expressions, of excluding any equivalents of the features shown and described or portions thereof except as specified above, but recognize that various modifications are possible within the scope of the invention claimed.

In the claims: Where the term "processing portion of the plant" or the like occurs, it means plant portions, e. g., such as valves 2 and 3, whose operation affects the process carried out by the plant, cooking in this case; such term being not limited to valves since obviously other processing means than valves may be used instead for other than cooking plants. Also where the word "meter" occurs in the claims, it means a device (5–10) having a movable element 8 whose position corresponds with and hence measures the value of a processing variable such, e. g., as the temperature to which the bulb 5 is sensitive. Also, where such an expression as "a driving means moving in correspondence with said quantity" occurs in the claims it means a motor of constant average speed in the case of a timer and any equivalent means where another progressively-variable quantity than time is involved.

I claim:
1. A timing system for a processing plant comprising, in combination, a member whose position is sensitive to the value of a processing con- dition, a pilot actuated by the member, and means governed by said pilot for controlling said condition; a timing means for predetermining the processing duration and including a timing motor, a timing cam, a means driven by said motor and operatively connected with said cam to actuate said cam in one direction, a means for moving said cam in the opposite direction, a detent for said timing cam for determining the position of the cam at substantially the beginning and end of a processing duration; a starting switch means also governed by said pilot for starting the timing motor, a starting means for initiating the processing duration including a manually operable starting portion and a running switch actuated upon a momentary operation of such portion and connected to the starting switch and to said motor to cause the running of the motor only when both switches are closed, and means for holding the running switch closed from the time when the starting means portion has been operated until the time when the cam reaches its stopping position and for operatively connecting the motor and the opposing driving means to the cam to determine the direction of motion of the cam, the last named means being operatively connected with the starting means to effect the stated connection and hence movement of the cam first in one direction and then the other following the actuation of said starting means portion; and means operatively connected with the starting means and effective upon the operation of said starting means portion for operating one processing portion of the plant relative to a processing position of said processing portion and for operatively connecting said pilot with the controlling means which it governs, and a separate means for operating another processing portion of the plant relative to a processing position of the last named processing portion in an adjustably predetermined relation with the position of the sensitive member.

2. In combination, a member whose position is sensitive to the value of a physical condition, a pilot actuated by the member, means governed by said pilot for controlling said condition, a timing cam means for predetermining a processing duration and including a timing motor, a timing cam arranged to be driveable by said motor in one direction and means for moving said cam in the opposite direction, a detent for said timing cam for determining the positions of the cam at substantially the beginning and end of the duration; a starting switch means also governed by said pilot, a starting means for initiating the duration including a manually operable starting portion and a running switch actuated upon a momentary operation of such portion and connected to the starting switch and to said motor to cause the running of the motor only when both switches are closed, and means for holding the running switch closed from the time when the starting means portion has been operated until the time when the cam reaches its stopping position, and for operatively connecting the motor and opposing driving means to the cam to determine the direction of motion of the cam, the last named means being operatively connected with the starting means to effect the stated connection and hence movement of the cam first in one direction and then the other following the actuation of said starting means portion; and means operatively connected with the starting means and effective upon the operation of said starting means portion for operatively connecting said pilot with the controlling means which it governs.

3. In a device for predetermining the value of a progressively variable quantity such as duration in the case of a timer, the combination of a base and a shaft which is mounted to be movable both rotatably and axially relative to said base; an adjustable means for predetermining said value and including a disk cam angularly adjustably mounted on said shaft substantially normal to and at least nearly concentric with said shaft, an arm substantially radially affixed to said shaft and having a cam-locking portion adjacent the periphery of said disk cam, said cam having a portion distinct from the periphery and settable as stated at an angle from said arm which corresponds with the thus-predetermined value, and a clamping means on said arm manually operable to lock the periphery of said disk cam against the said clamping portion of said arm to keep said angle constant during the operation of the device and to release the stated locking when angularly adjusting the cam; a detent arranged to separately coact with said arm and with said cam portion to determine the starting and stopping ends of said angle; a means continuously rotatably biasing said arm about the shaft's axis in one direction; a stronger driving means than this last-named means and a clutch having one part which rotates on the axis of said shaft through an angle that is proportional to the total value of said quantity but which part is not axially movable along said shaft relative to said base and a coacting clutch part which is connected with said arm to be movable both rotatably and axially therewith and with said shaft as the shaft moves relative to said base, said driving means being arranged to drivingly turn the arm against said rotatable bias when the clutch is engaged; means for axially biasing the shaft toward the clutch engaging axial position to cause said arm and said cam to move through said angle upon a progressive change of the quantity until the quantity reaches the value which is predetermined by said angle; and fluid pressure operated means operatively connected to the last named means to overcome the stated axial bias when the pressure exceeds a fixed amount to then release the clutch and hence permit the stated rotatably biasing means to turn the arm from its then-position back to its starting position.

4. The combination set forth in claim 3 in which said arm is provided with a conical hub, the disk cam comprises a disk whose peripheral radius is slightly greater than that of the locking portion of the arm and has a concentric hole which is slightly greater in diameter than that of the conical portion of the hub at the locking position, and the stated manually operable clamping means comprises a means on said hub for moving the disk cam axially along said conical hub to radially move the periphery of the cam into or out of locking engagement with the clamping portion of the arm.

5. In a device for cyclically predetermining the value of a progressively variable quantity such as duration in the case of a timer, the combination of a base and a shaft which is mounted to be movable both rotatably and axially relative to said base; an adjustable means for predetermining said value and including a predetermining means having two portions which are relatively angularly adjustable within a total angular range to set the total value of said quantity, one of said portions being affixed to said shaft; a detent arranged to coact with each of said predetermining means portions to act as a limit stop therefor when they are in angular positions which respectively correspond with the beginning and end of a cycle; a means operatively connected with said quantity predetermining means to rotatably bias the latter toward the starting position in which one of the latter's said portions is stopped by said detent; a driving means movable in correspondence with the progressively changing value of said quantity; a clutch for connecting said portions with said driving means in one axial position of the shaft in which the clutch is engaged to then permit the driving means to turn the shaft in the other direction until the other of said portions is stopped by the detent at the end of a cycle, and for disconnecting said portions from said driving means in another axial position of said shaft in which said clutch is disengaged; a means for axially biasing the shaft towards the stated axial position in which the clutch is engaged, and a manually operable means for moving the shaft axially against the bias of said axially biasing means to temporarily disengage the clutch, said manually operable means being operatively connected with the driving means to prepare, upon the operation of the manually operable means, the driving means for starting; means for starting said driving means; and a means operatively connected with the driving means to start the driving means, and also to stop the driving means when said other portion is stopped by said detent and hence prevent the clutch from slipping.

6. The combination set forth in claim 5 in which one of said means portions is a starting arm which includes a locking portion and is arranged to fetch up against said detent at the start of a cycle and the other is a disk cam whose periphery is constructed and arranged to coact with the locking portion and in which periphery there is a stopping notch into which said detent can enter at the end of a cycle, and said detent is constructed to be resilient and disposed in a stopping position in the notch in the position of the cam at the end of the cycle and arranged to be actuated by the clutch disengaging means to a running position at a greater radius than that of the periphery of said disk cam and in the path of the starting arm, whereby when the clutch is disengaged the detent is moved out of the notch and the arm rotates to quickly fetch up against the detent and stop without an adjustment-upsetting jar, after which the detent is held in the running position by the periphery of the cam until it again takes its stopping position within the notch.

7. The combination set forth in claim 6 in which said device operates in connection with a system to be controlled and includes a means connected with the manually operable means for altering the value of a physical condition in the system after such means is manually operated, and also includes a means sensitive to said value and operatively connected with the driving means to initiate the operation of the driving means when the sensed value of the condition reaches a predetermined value.

8. In a device of the class disclosed for predetermining the value of a quantity such as duration in the case of a timer, a quantity predetermining means including portions which are relatively adjustable to set the quantity, a movable detent arranged to coact with said portions to act as limit stops therefor and to have different positions when said portions are in positions which respectively correspond with the beginning and end of a cycle, a biasing means operatively connected with said portions for moving them in one direction, a driving means moving in correspondence with said quantity and operatively connected with said portions for moving them in the opposite direction, a starting means operatively connected with the driving means and with the detent to initiate the operation of the driving means when said starting means is operated and the detent is in a position which corresponds with the beginning of a cycle, and a running means operatively connecting the detent with the driving means to stop the driving means when the detent is in a position which corresponds with the end of a cycle.

9. In a cycle-timing system for a processing plant having an air supply and a valve for controlling a processing condition, the combination of a member whose position is sensitive to the value of said processing condition, a control pilot connected to the air supply and actuated by the member to set up a corresponding pilot pressure over a range of operating positions of the member, a bellows, a spring-opposed diaphragm positioning the control valve and arranged to have the spring close said valve, and a control air line connecting said pilot pressure with both said bellows and said diaphragm; a manually operated cycle-starting means including a starting pilot connected to the air supply to create a high pressure impulse of appreciable duration upon even a very short manual operation of a portion of said cycle-starting means; a timing motor, a detent, a running switch for said motor operated by the detent to be respectively closed and open when the detent is in timer-running and timer-stopping positions, and a starting switch for said motor operated by said bellows upon a departure of the value of said control pilot pressure from a set value, whereby the attainment of a value of the processing condition predetermined by the control pilot starts the timing motor to run for a total processing duration during which the condition is under control; a sleeve driven by the timing motor, a shaft within the sleeve and movable both rotatably and axially therein, a clutch for rotatably driving said shaft by said sleeve and constructed to be engaged in only one axial position of the shaft, an adjustable timing means attached to the shaft and having two portions which are relatively angularly adjustable to set the processing duration, and a means rotatably biasing said timing means portions relative to said detent from the set cycle-end position toward the cycle-beginning position, said timing means and said detent being so constructed and relatively arranged that the detent angularly limits the rotatably biased movement of the timing means as the timing means moves from its position at the end of one timed cyclical duration to that at the beginning of the next cycle, and the timing means holds the detent in its timer-running position from the beginning of a cycle until the end of the timed duration of such cycle and then coacts with the detent to move the detent to its timer-stopping position; a means axially biasing the shaft towards the clutch engaging position, and a second diaphragm connected to the cycle-starting means and subject to said high pressure impulses and operatively connected to the shaft to temporarily move the shaft against the stated axial bias and away from its clutch engaging position and also operatively connected to the detent to move the detent relative to said timing means from its timer-stopping position to its timer-running position upon the stated impulse-response of said second diaphragm and hence to release the timing means for rotation then by its rotatable biasing means from the timing-means cycle-end position to its cycle-beginning position; and a second bellows, a pilot operated by the detent to connect and disconnect the supply pressure with the second bellows in accordance with the position of the detent, and a block-and-leak valve in the control air line positioned by the second bellows to connect the control valve diaphragm with the control pilot pressure only when the detent is in its timer-running position and with the atmosphere when the detent is in its timer-stopping position to then have the diaphragm-opposing spring move the control valve to a non-processing position.

10. A timing system for a processing plant comprising in combination, a process controller; a meter for the value of a processing variable; a timer including a movable adjustable portion whose predetermined extent of movement determines a timed processing interval and a manually operable means for starting said movement; two means actuated by said starting means upon the manual operation of said starting means respectively to then operatively connect said meter with said controller to govern the controller to bring the processing variable to a predetermined value and to then bring said movable portion of the timer to its starting position if it be not already there; a means actuated by the meter in accordance with the attainment of substantially the predetermined measured value of the processing variable to then start the timer to cause the movement of its said movable portion through its said predetermined extent of movement, whereby said timed processing interval occurs while the processing condition is controlled at its said predetermined value; a means for stopping the movement of the movable portion of the timer at the end of its said predetermined extent of movement; a means actuated by the timer stopping means when it stops the timer to then operatively disconnect the controller from the means connecting the controller with the meter and to govern the controller to a condition in which it brings the processing variable to a non-processing value; and a means actuated by the meter for preventing the starting of the timer as long as a non-processing measured value of the processing variable exists.

11. The timing system set forth in claim 10 in which the plant includes a processing means movable relative to a processing position, and said system includes a means acting automatically between said manual operation and said start of the timed processing interval to operate said processing means to a steady processing position, and a means acting automatically following said stopping of the timer to return the processing means to its stated non-processing position.

12. The timing system set forth in claim 10 in which the plant includes a processing means movable relative to a processing position, and said system includes a means actuated by a portion of the starting means which coacts with said movable portion of the timer upon the manual operation of the starting means to then operate said processing means to a processing position, said movable portion of the timer being constructed and arranged relative to said starting means portion to hold the latter in a position to steadily maintain the latter's said actuated means in a position to maintain said processing means in its said processing position as long as said timed processing duration exists and, at the end of said duration, to cause said starting portion to stop said movable portion of the timer and to return both said starting means portion and the latter's said actuated means to their original positions in which said actuated means effects the return of said processing means to its original non-processing position.

13. The timing system set forth in claim 10 in which the plant includes a processing means movable relative to a processing position, and said system includes a means actuated by the meter as long as the measured value of the processing variable is substantially at its said predetermined value to then position said processing means at its said processing position and, at all other times, to maintain said processing means in its original non-processing position.

PAUL F. K. ERBGUTH.

CERTIFICATE OF CORRECTION

Patent No. 2,351,326.  June 13 1944.

PAUL F. K. ERBGUTH.

It is hereby certified that error appears in the printed specification of the above numbered patent requiring correction as follows: Page 5, firs column, line 59, claim 7, for the claim reference numeral "6" read --5-- and that the said Letters Patent should be read with this correction there in that the same may conform to the record of the case in the Patent Offic Signed and sealed this 8th day of August, A. D. 1944.

Leslie Frazer

Acting Commissioner of Patents.

(Seal)